US011669308B2

(12) United States Patent
Fletcher et al.

(10) Patent No.: US 11,669,308 B2
(45) Date of Patent: Jun. 6, 2023

(54) SYSTEM AND METHOD FOR GENERATING A FACTORY LAYOUT FOR OPTIMIZING MEDIA CONTENT PRODUCTION

(71) Applicant: Grass Valley Canada, Montreal (CA)

(72) Inventors: Ian David Fletcher, Derbyshire (GB); Charles S. Meyer, Crystal Bay, NV (US); Michael Cronk, Portland, OR (US); James Westland Cain, Newbury (GB)

(73) Assignee: GRASS VALLEY CANADA, Montreal (CA)

( * ) Notice: Subject to any disclaimer, the term of this patent is extended or adjusted under 35 U.S.C. 154(b) by 0 days.

(21) Appl. No.: 17/324,001

(22) Filed: May 18, 2021

(65) Prior Publication Data

US 2021/0365247 A1  Nov. 25, 2021

Related U.S. Application Data

(60) Provisional application No. 63/027,126, filed on May 19, 2020.

(51) Int. Cl.
*G06F 8/34* (2018.01)
*G06F 11/34* (2006.01)
*G06F 8/41* (2018.01)

(52) U.S. Cl.
CPC ............... *G06F 8/34* (2013.01); *G06F 8/443* (2013.01); *G06F 11/3428* (2013.01)

(58) Field of Classification Search
None
See application file for complete search history.

(56) References Cited

U.S. PATENT DOCUMENTS 8,397,264 B2 * 3/2013 Ansari ................ H04L 12/2818
725/74
9,621,428 B1 * 4/2017 Lev .......................... H04L 41/12
(Continued)

FOREIGN PATENT DOCUMENTS

CA    3100908    11/2019
JP    2003067051    3/2003

OTHER PUBLICATIONS

Gadea, Cristian, et al. "A microservices architecture for collaborative document editing enhanced with face recognition." 2016 IEEE 11th International Symposium on Applied Computational Intelligence and Informatics (SACI). IEEE, 2016. (Year: 2016).*

(Continued)

*Primary Examiner* — Matthew J Brophy
(74) *Attorney, Agent, or Firm* — ArentFox Schiff LLP

(57) ABSTRACT

A system and method are provided for generating a factory layout to dynamically optimize a media content production in a real-time environment. The system includes a media production optimizer with a widget controller that provides widgets that represent work packages as micro-services that perform functions of the media content production, respectively. A user interface controller receive inputs from a user interface to dynamically update the factory layout for the media content production. The media production optimizer then recompiles underlying code to update a model of the factory layout in response to the inputs from the operator of the system, and also migrates the updated factory layout to a cloud platform that includes a plurality of media production components including the plurality of micro-services for deployment thereon.

18 Claims, 9 Drawing Sheets

(56) References Cited

U.S. PATENT DOCUMENTS

| | | | | |
|---|---|---|---|---|
| 10,331,423 | B1* | 6/2019 | Parsolano | G06F 8/20 |
| 10,884,732 | B1* | 1/2021 | Zolotow | G06F 8/76 |
| 10,956,130 | B2* | 3/2021 | Rizo | G06F 8/35 |
| 11,099,976 | B2* | 8/2021 | Khakare | G06F 3/0486 |
| 11,150,895 | B1* | 10/2021 | Wall | G06F 8/60 |
| 11,233,871 | B2* | 1/2022 | Roberts, Jr. | H04L 67/306 |
| 11,295,274 | B1* | 4/2022 | Ghasem Khan Ghajar | G06F 9/547 |
| 2005/0134872 | A1* | 6/2005 | Maki | B41F 33/0036 358/1.9 |
| 2015/0088977 | A1* | 3/2015 | Monesson | H04L 65/765 709/203 |
| 2016/0149956 | A1* | 5/2016 | Birnbaum | H04L 63/20 726/1 |
| 2019/0090002 | A1* | 3/2019 | Ramadorai | H04N 21/25833 |
| 2019/0364081 | A1* | 11/2019 | Valenzuela | H04L 65/762 |
| 2020/0012480 | A1* | 1/2020 | Rizo | G06F 21/577 |
| 2020/0387357 | A1* | 12/2020 | Mathon | G06F 9/4411 |
| 2020/0409724 | A1* | 12/2020 | DiMascio | G06F 40/14 |
| 2021/0055917 | A1* | 2/2021 | Khakare | G06F 3/0482 |
| 2021/0055927 | A1* | 2/2021 | Sarukkai | G06F 8/71 |
| 2021/0141712 | A1* | 5/2021 | Gevorkyan | G06F 16/22 |
| 2021/0357265 | A1* | 11/2021 | Masek | G06F 9/5055 |
| 2022/0052910 | A1* | 2/2022 | Neelakantam | G06F 3/0619 |

OTHER PUBLICATIONS

Štefanič, Polona, et al. "Switch workbench: A novel approach for the development and deployment of time-critical microservice-based cloud-native applications." Future Generation Computer Systems 99 (2019): 197-212. (Year: 2019).*

International Searching Report and Written Opinion issued for PCT/CA2021/050679, dated Oct. 5, 2021.

* cited by examiner

SYSTEM AND METHOD FOR GENERATING A FACTORY LAYOUT FOR OPTIMIZING MEDIA CONTENT PRODUCTION

CROSS REFERENCE TO RELATED APPLICATIONS

The current application claims priority to U.S. Patent Provisional Application No. 63/027,126, filed May 19, 2020, the entire contents of which are hereby incorporated by reference.

TECHNICAL FIELD

The system and method disclosed herein is related to media production, and, more particularly, to a system and method for generating a factory layout to dynamically optimize a media content production in a real-time environment.

BACKGROUND

Live media production typically involves capturing media content from one or a plurality of live scenes (e.g., a sports venue, news broadcast, video game platforms, and the like), transmitting the captured content to a remote production facility where the video and audio signals are managed by production switchers, graphics effects are added, and the like, and then processed signals are encoded for transport to a distribution network, such as a television broadcasting network, through one or a plurality of signals. Moreover, with the continuous growth, development and accessibility of cloud computing platforms, such as Amazon Web Service® ("AWS"), many of the processing components involved in a typical media production environment are being moved to "the Cloud" and/or being distributed broadly across a number of geographical locations.

Yet further, broadcasting and media production has evolved from analog to digital domain and across various protocols (e.g., MPEG-2, Internet Protocol (IP), IPTV, Ethernet). In IP technology, there are myriad tools, software code bases, and the like, that present an infinite set of combinations, or development efforts, which lead to a final "product" (e.g., a media production). These distributed systems and configurations are not extensible, nor scalable. Similarly, companies needs to rapidly develop new applications, and the best return on investments is achieved with valuable customer facing applications, not low level infrastructure code. Accordingly, a system and method is need to dynamically manage media production, especially in a live environment.

SUMMARY OF THE INVENTION

The system and method described herein is provided to enable any media factory designer (e.g., systems integrator, sales engineer or the like) to develop plant/production layout, or equally a workflow, to work and meet optimal performance criteria. A graphical layout tool is used to manipulate symbols that represent functional elements of the desired workflow. The symbols all have unique identity and can be comprised of additional functions, such as micro-services, each with their own identity. The ability to concatenate, or cascade these lower building blocks provides for rapid development, better system regression testing, improved reliability as well as adaptation so that infrastructure as code ("IAC") and configuration as code ("CAC") can be a secondary output based on which infrastructure, or infrastructures may be targeted for deployment. According to an exemplary aspect, the generated IAC and CAC enable porting, which effectively is the a "lift and shift" of the resulting factory across physical deployments, such as cloud computing infrastructures.

In operation, a workflow is effectively compiled and the IAC and CAC are co-generated in addition. Because the functional blocks (e.g., widgets or symbols or modules) are developed with a common regression test environment, the workflow is functional. Moreover, in order to ensure optimal workflow compile, it is essential that low level code models do not unnecessarily, or unintentionally, cross-link. This cross-linking makes is difficult to ensure that future revisions of each unique module do not have unintended effects on the rest of the workflow modules, and dependencies, included in the design.

Thus, according to an exemplary aspect, a system is provided for generating a factory layout to dynamically optimize a media content production in a real-time environment. In this aspect, the system includes a media production optimizer that includes a widget controller configured to provide a plurality of widgets that represent work packages as a plurality of a micro-services that each perform an atomic function of the media content production, respectively; a database configured to store the plurality of widgets; a user interface controller configured to receive inputs from an operator of a user interface of the system to dynamically update the factory layout for the media content production, wherein the received inputs include respective position of the plurality of widgets and moving connection lines between at least a portion of the plurality of widgets displayed on the user interface to represent a data flow of media essence for the media content production; and a network and configuration analyzer configured to receive real-time performance characteristics relating to operations of the plurality of micro-services.

Moreover, in an exemplary aspect, the user interface provides information buttons for each of the plurality of widgets included in the factory layout that identify the real-time performance characteristics of the plurality of micro-services, respectively; the media production optimizer is configured to recompile underlying code to update a model of the factory layout in response to the inputs from the operator of the system; the media production optimizer is configured to render infrastructure as code ("IAC") and configuration as code ("CAC"); and the media production optimizer is configured to migrate, using the IAC and CAC, the updated factory layout to a cloud platform that includes a plurality of media production components including the plurality of micro-services for deployment thereon for performing the media content production.

In another exemplary aspect, the user interface is configured to display each widget of the plurality of widgets to an information button that displays a health indictor corresponding to at least one of a status and a functionality of the respective widget.

In another exemplary aspect, as the user interface controller receives inputs from the operator via the user interface to dynamically update the factory layout for the media content production, the media production optimizer is configured to logically organize and compile underlying code to model the factory layout.

In another exemplary aspect, each widget of the plurality of widgets comprises one of an analysis widget, tape-in widget, a switcher widget and an output widget.

In another exemplary aspect, the user interface controller is configured to dynamically change the factory layout in response to receiving the inputs from the operator that include dragging and dropping additional widgets of the plurality of widgets from a widget catalog, and then at least one of dragging and dropping additional connection lines and rerouting existing connection lines between an existing widget in the factory layout and at least one of the additional widgets.

In another exemplary aspect, the media production optimizer is configured to dynamically recompile the underlying code to enable the operator to view a debug of the factory layout in real time, with the debug including a display of real-time feedback of how the dynamic changes to the factory layout affect at least one of bandwidth constraints, latency, and quality to the media content production.

According to another exemplary embodiment, a system for generating a factory layout to dynamically optimize a media content production in a real-time environment. In this aspect, the system includes a media production optimizer that includes a widget controller configured to provide a plurality of widgets that represent work packages as a plurality of a micro-services that each perform an atomic function of the media content production, respectively; a database configured to store the plurality of widgets; a user interface controller configured to receive inputs from an operator of a user interface of the system to dynamically update the factory layout for the media content production, wherein the received inputs include respective position of the plurality of widgets and moving connection lines between at least a portion of the plurality of widgets displayed on the user interface to represent a data flow of media essence for the media content production; and a network and configuration analyzer configured to receive real-time performance characteristics relating to operations of the plurality of micro-services.

Moreover, in an exemplary aspect, the user interface provides information buttons for each of the plurality of widgets included in the factory layout that identify the real-time performance characteristics of the plurality of micro-services, respectively; the media production optimizer is configured to recompile underlying code to update a model of the factory layout in response to the inputs from the operator of the system; and the media production optimizer is configured to migrate the updated factory layout to a cloud platform that includes a plurality of media production components including the plurality of micro-services for deployment thereon for performing the media content production.

According to another exemplary embodiment, a system for generating a factory layout to dynamically optimize a media content production in a real-time environment. In this aspect, the system includes a media production optimizer that includes a widget controller configured to provide a plurality of widgets that represent work packages as a plurality of a micro-services that each perform a function of the media content production, respectively; and a user interface controller configured to receive inputs from an operator of a user interface to dynamically update the factory layout for the media content production, wherein the received inputs include respective position of the plurality of widgets and establishing connection lines between at least a portion of the plurality of widgets displayed on the user interface to represent a data flow of media essence for the media content production. Moreover, the media production optimizer is configured to recompile underlying code to update a model of the factory layout in response to the inputs from the operator of the system, and the media production optimizer is further configured to migrate the updated factory layout to a cloud platform that includes a plurality of media production components including the plurality of micro-services for deployment thereon.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF DRAWINGS

The accompanying drawings, which are incorporated into and form a part of this specification, illustrate one or more example aspects of the present disclosure and, together with the detailed description, serve to explain their principles and implementations.

DETAILED DESCRIPTION

Figure 1:
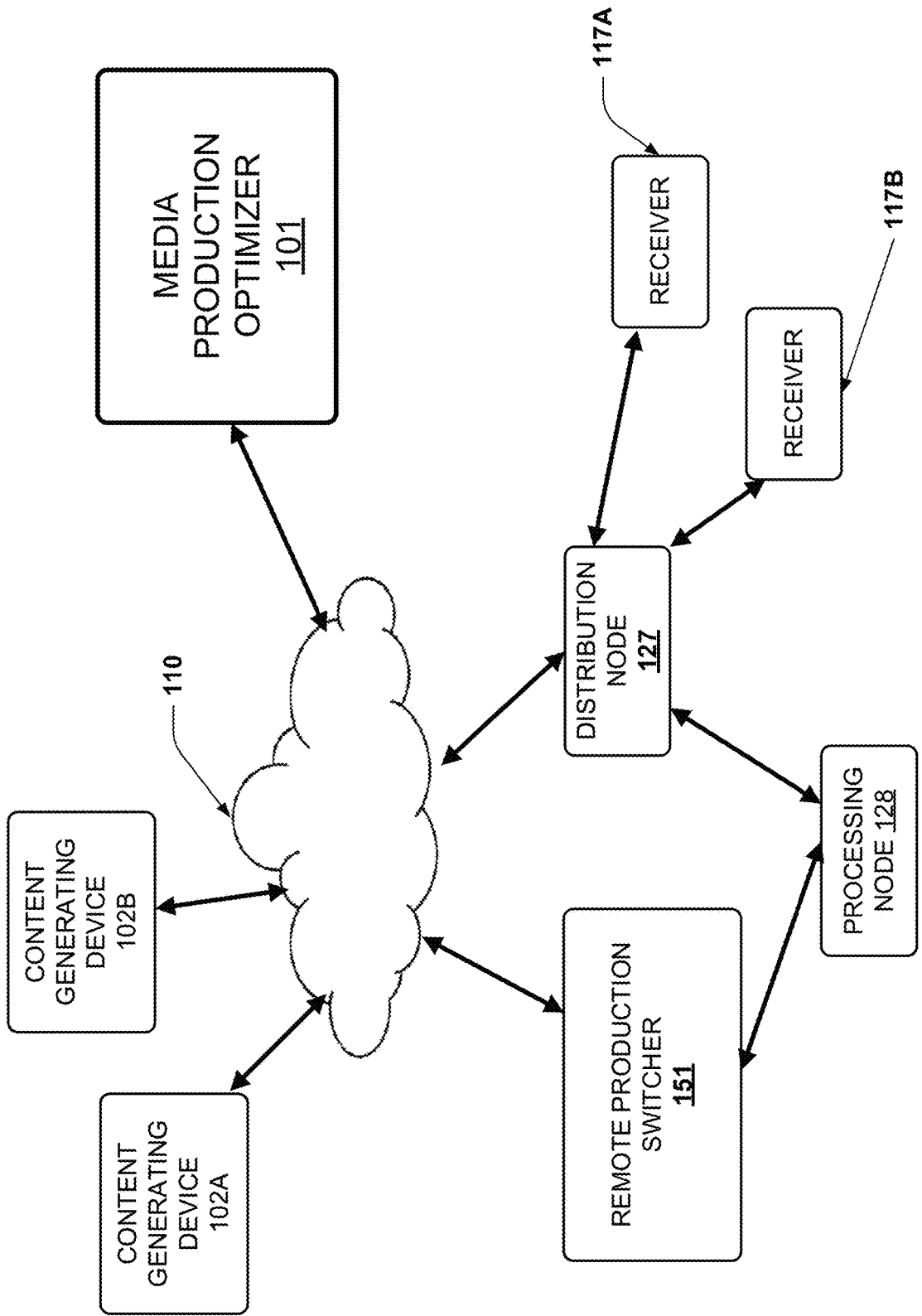
FIG. 1 illustrates a block diagram of a system for dynamically optimizing media content generation and productions in a real-time environment according to an exemplary embodiment.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In general, certain aspects of the media production optimization system will now be presented with reference to various systems and methods. These systems and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

FIG. 1 illustrates a block diagram of a system for dynamically optimizing media content generation and productions in a real-time environment according to an exemplary embodiment. As will be described in detail below, the exemplary system 100 includes a design interface tool (e.g., a computer-aided design (CAD) software tool) that is configured to model and dynamically manage and optimize a media production environment. In general, media content provided for production according to system 100 is generally referred to as "essence", which denotes media that can be consumed by a user (e.g., a video clip, an audio clip, and/or ancillary data such as captions). It is also noted that while the system 100 is described in terms of a real-time environment or live production, the system is not so limited and can be implemented for any type of workflow for media production, for example.

As shown, the system 100 includes a media production optimizer 101, which is the tool that is configured to develop and map a video production configuration on a user interface in terms of applications and components of the system and the connections between them. As will be described in more detail below, the user interface generated by the media production optimizer 101 is configured as a system dashboard that enables operators to create layouts of widgets (or icons) that can be wired together to create a flow diagram that models a media content production configuration, for example.

In an exemplary aspect, the media production optimizer 101 can be executed using domain specific language ("DSL"), which provides the necessary abstraction so that upper level code in the applications stack can be designed with confidence that southbound code is stable and behaviorally correct. This configuration enables more focus on the applications, or higher ordered workflow functions, and especially collections of them. Moreover, DSL provides the abstraction bilaterally: Southbound masks the complexity of the micro-service details, using essential nouns, to rapidly build such higher level functions, and Northbound, it can act as a thesaurus. The nouns can be mapped to already existing applications, so that they are configured to be moved into the unified development and deployment platform.

Moreover, as noted above, while the exemplary embodiment is described in the context of media production and specifically live or real-time media production or broadcast, the disclosed system and method can be implemented to generate and model a factory for any number of industries as a technique to map a development technology (e.g., a manufacturing factory) that solves the development issues for both the customer and the programmer. That is, media production optimizer 101 can equally be implemented as a factory optimization tool in various software and hardware manufacturing and creation environments.

FIG. 1 illustrate a block diagram for an exemplary embodiment that is specific to a live media production environment. In general, it should be understood that the media production optimizer 101 is configured to generate a model or factory of media production as shown in system 100 of FIG. 1. Thus, the media production optimizer 101 can generally be located remotely from all of the other components in the system and, in some embodiments, coupled to the components (which can be part of a cloud computing environment) to effectively build the media production system. Thus, the components shown in system 100 are provided as an exemplary system that can be modeled by the media production optimizer 101.

As shown, system 100 includes a plurality of content generating devices 102A and 102B. In an exemplary aspect, plurality of content generating devices 102A and 102B can be configured for providing/transmitting an A/V feed across links via the network 110. Moreover, it is noted that while only two devices are shown, the system 100 can be implemented using any number of content generating devices. The plurality of content generating devices 102A and 102B can also include, for example, remote camera's configured to capture live media content, such as the "talent" (e.g., news broadcasters, game commentators, or the like). Moreover, the content generating devices 102A and 102B can include Esports (electronic sports) real-time content, or the like. In general, it should be appreciated that while the exemplary aspect uses content generating devices 102A and 102B (which may be located at a live event, for example), a similar configuration can be used for a remote video server, for example, that is configured to store media content and distribute this audio, video and/or ancillary content through the media distribution network.

As further shown, the plurality of content generating devices 102A and 102B can be coupled to a communication network, such as the Internet 110, and/or hardware conducive to internet protocol (IP). That is, system 100 can be comprised of a network of network servers and network devices configured to transmit and receive video and audio signals of various formats. As noted above, in one aspect, the processing components of system 100 can be executed in part of a cloud computing environment, which can be coupled to network 110. Moreover, the media production optimizer 101 can be configured to access the video and audio signals generated by (or otherwise provided by) the content generating devices 102A and 102B, or information related to the various signals, as will be described in detail below.

In general, cloud computing environments or cloud platforms are a virtualization and central management of data center resources as software-defined pools. Cloud computing provides the ability to apply abstracted compute, storage, and network resources to the work packages provided on a number of hardware nodes that are clustered together forming the cloud. Moreover, the plurality of nodes each have their specialization, e.g., for running client micro-services, storage, and backup. A management software layer for the application platform offered by the cloud will typically be provided on a hardware node and will include a virtual environment manager component that starts the virtual environments for the platform and can include micro-services and containers, for example. Thus, according to an exemplary aspect, one or more of the components (or work packages) of system 100 that can be implemented in the cloud platform as described herein can further be implemented in one or more software containers, which are isolated from one another and bundle their own software, libraries and configuration files. The containers with the cloud platform can be configured to communicate with each other through well-defined channels and can run by a single operating system kernel. As will be described below, the use of containers (also referred to as pods) enables the dynamic updating of works packages using the inventive system and method described herein.

As yet further shown, system 100 can include one or more remote distribution node(s) 127, one or more processing node(s) 128, and one or more remote production switcher(s) 151. As noted above, these components can be implement as hardware components at various geographical locations or, in the alternative, as processing components as part of a cloud computing environment (e.g., in one or more containers or pods within the cloud platform). The one or more distribution nodes 127 (e.g., electronic devices) are configured to distribute the production media content to one or more distribution nodes (e.g., remote media devices), such as receivers 117A and 117B, which can be content consuming devices (e.g., televisions, computing devices, or the like), for example. Moreover, it should be appreciated that while only two receivers 117A and 117B are shown, the network can include any number of content consuming devices configured to receive and consume (e.g., playout) the media content, with such content consuming devices even being distributed across different countries or even different continents. As a result, the system 100 can be configured as a media network for real-time production and broadcasting of video and audio content.

Yet further, system 100 can include additional components that are typically included a video production system that are well known to those skilled in the art and are not shown in FIG. 1. More particularly, system 100 can include one or more codecs configured to encode in the video signals at a particular compression format for the transmission to satisfy the media request parameters. In general, such codecs are configured to perform encoding of video and audio data into data packets for transmission over IP in the media distribution network. In some examples, codecs may encode video and audio data into non-compressed (e.g., linear pulse code modulation, pulse-density modulation, direct stream digital pulse-amplitude modulation, etc.), lossless (e.g., free lossless audio codec, optimFROG, wavepak, true audio, etc.), and lossy (e.g., adaptive differential (or delta) pulse-code modulation, adaptive transform acoustic coding, MPEG-1, MPEG-2, MPEG-3, MPEG-4, etc.).

Moreover, in this network, distribution node(s) 127 can further be configured to distribute the media content throughout the distribution network to one or more processing node(s) 118, which may include a mix/effects engine, keyer or the like. In addition, remote distribution node(s) 127 can be configured to feed remote processing node(s) 128 via a direct link, or via Internet 103 connection. Examples of remote distribution node(s) 127 and processing node(s) 128 may include remote production switches similar to remote production switcher 151 or remote signal processors.

Figure 2:
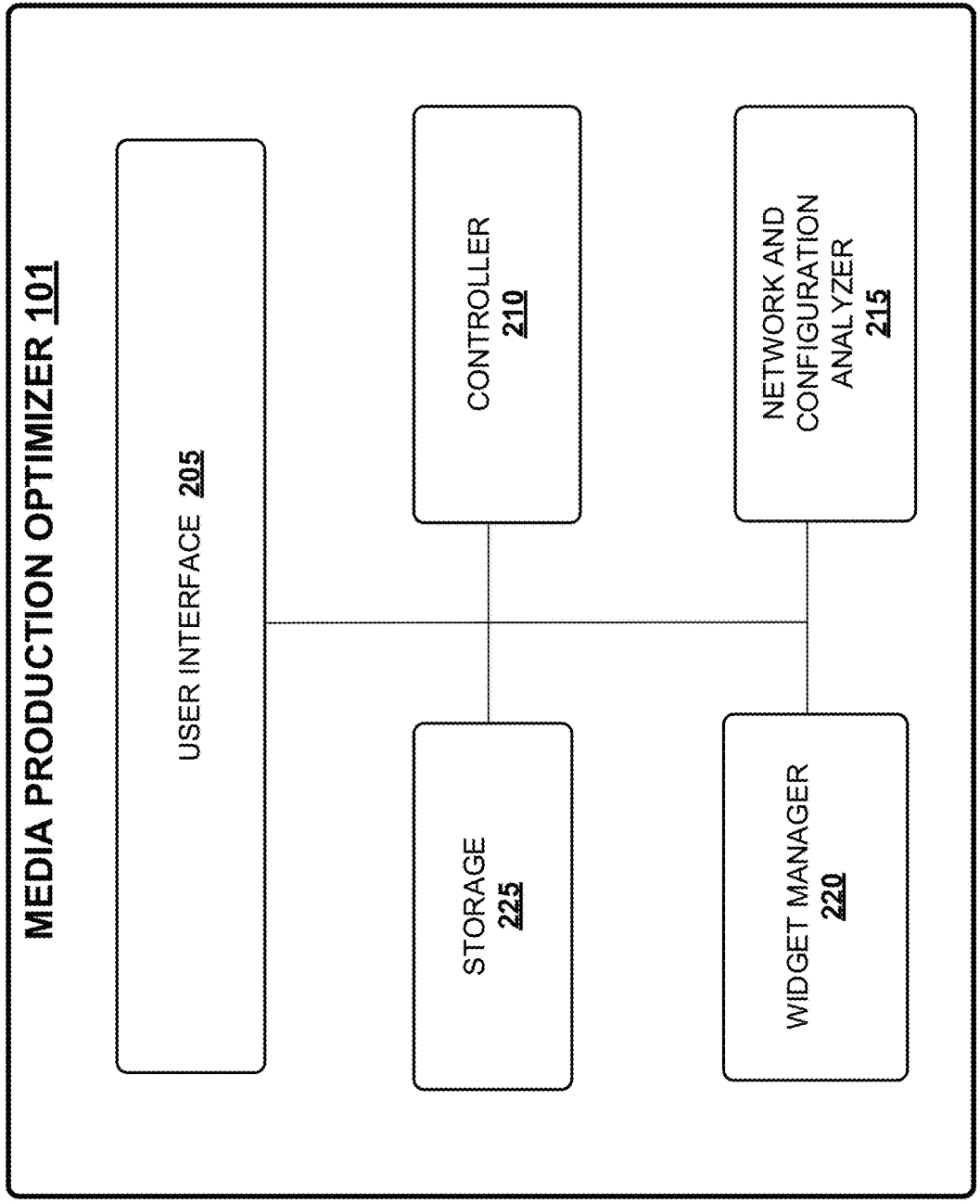
FIG. 2 illustrates a block diagram of the media production optimizer of the system for dynamically optimizing media content generation and productions according to the exemplary embodiment.

FIG. 2 illustrates a block diagram of the media production optimizer 101 of the system 100 for dynamically optimizing media content generation and production according to the exemplary embodiment. In general, the media production optimizer 101 can be implemented on one or more computing devices that is communicatively coupled to the network for media production as shown above. Moreover, the media production optimizer 101 includes a plurality of components for executing the algorithms and techniques described herein.

More specifically, the media production optimizer 101 includes a user interface 205, a controller 210, network and configuration analyzer 215, widget manager 220 and storage 225. In general, the storage 225 can be implemented as electronic memory configured to store the one or more media production configurations (e.g., the user-defined factories or layouts), widget libraries, and the like, as will be described in more detail below.

In an exemplary aspect, the controller 210, network and configuration analyzer 215 and widget manager 220) can be implemented as software engines or modules configured as module for executing the algorithms disclosed herein, for example. The term "module" refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

As described above, the system is configured to generate a system dashboard that enables a user to create and dynamically modify layouts of widgets that can be wired together to create a flow diagram for a process, such as a media content production. Thus, according to the exemplary aspect, the controller 210 is configured to generate and/or access a user interface 205 on a screen of the computing device, for example, that enables a user to configure and model such workflows.

As an operator of the system dashboard places and routes the components of the layout (i.e., the widgets), the media production optimizer 101 is configured to logically organize and compile the underlying code to model the factory. As a result, the system operator can see the debug in "real time" as he or she designs and compiles the factory. Moreover, the components of the factory are represented by widgets and are considered work packages, which could be a micro-service or a set of micro-services that perform an atomic function of the video production process. In an exemplary aspect for a broadcast factory, the work packages can include, for example, receiver micro-services, sender micro-services, player micro-services, recorder micro-services, multi-viewer micro-services, graphics micro-services, UDX micro-services, mix effect micro-services, and fabric micro-services.

Figure 3A:
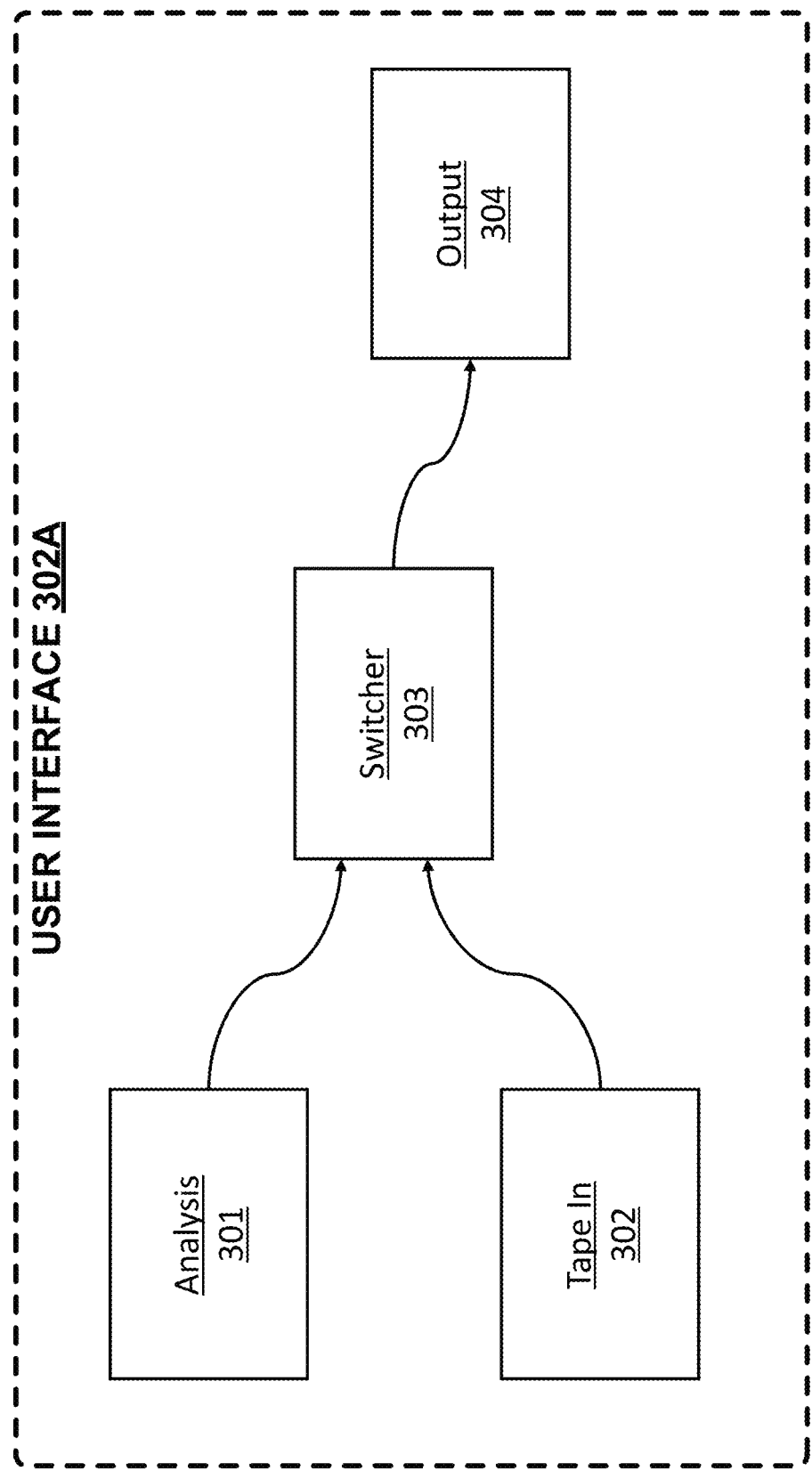
FIGS. 3A and 3B illustrate an example of a user interface configured to design and/or model a topology (e.g., a factory) for producing media content according to the exemplary embodiment.
Figure 3B:
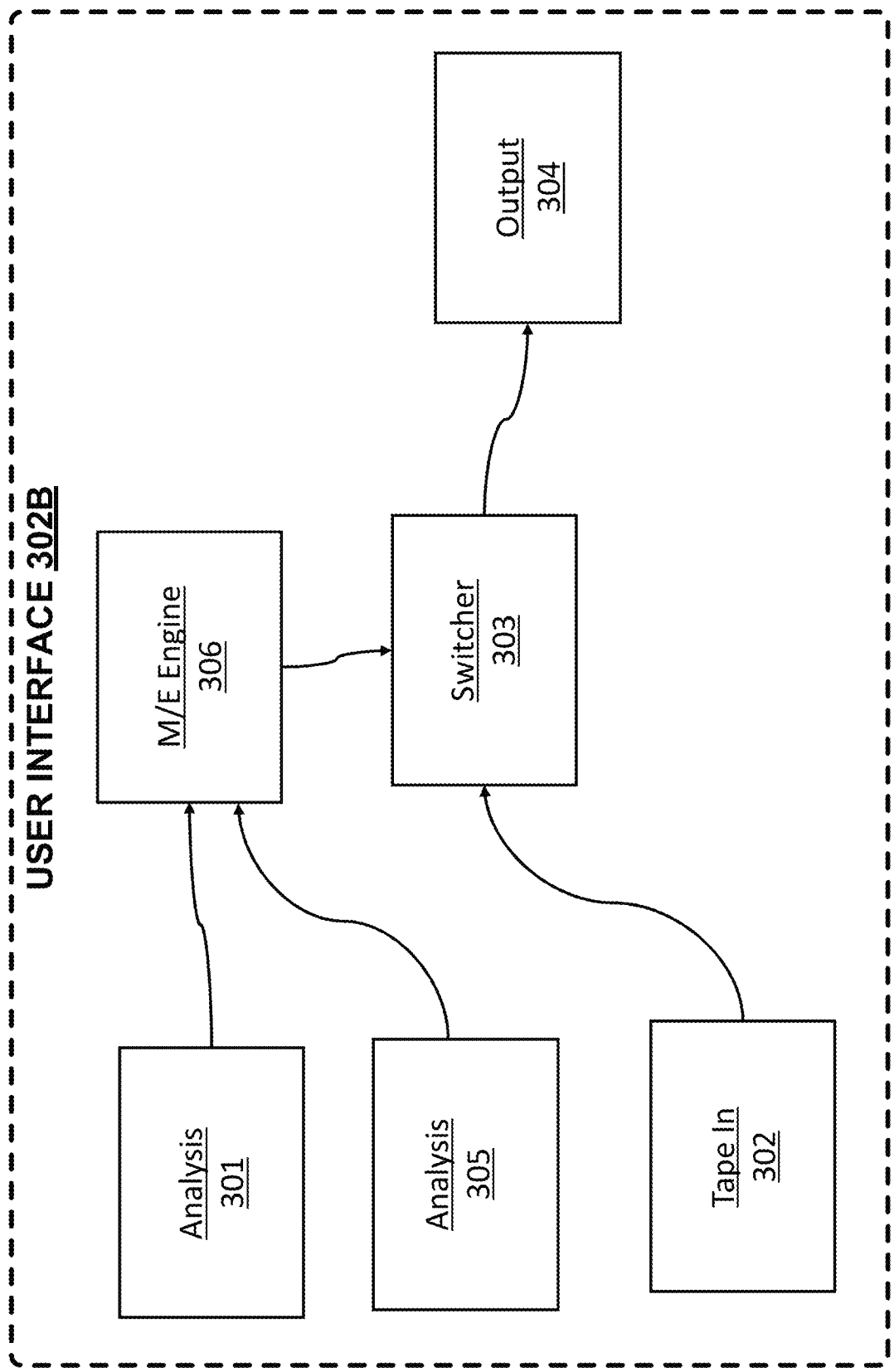

FIGS. 3A and 3B illustrate an example of a user interface 205 configured to design and/or model a topology (e.g., a factory) for producing media content. It should be appreciated that FIGS. 3A and 3B provide a simplistic example of a media production topology (i.e., a layout) for illustrative purposes, but that the system and method can be implemented for highly complex data processing environments to build sophisticated factories as will be appreciated to one skilled in the art. Moreover, the user controller 210 is coupled to the widget manager 220 to add, change and/or remove widgets from the layout on the user interface 205 to build and optimize the factory. Effectively, the user can dynamically create and modify the components used as part of the media production environment and infrastructure to perform a desired workflow of the media production. It is also noted that the controller 210 and widget manager 220 are shown as separate components, but can be implemented as a single component in an alternative embodiment.

As noted above, the components of the factory layout are work packages that can be represented as widgets. In general, a "widget" is a component of the layout (generated in the user interface 205) that enables the operator to establish a function or access a service for the media production system 100. FIG. 3A illustrates a first instance of a user interface 302A that includes four widgets, which include "analysis" 301, "tape in" 302, "switcher" 303 and "output" 304. Each of these widgets corresponds to a micro-service for a function and/or component of the media production process. For example, "tape in" 302 may be media content stream from a video server and "analysis" 301 may be a stream of the "talent's" report or commentating of the content. Moreover, "switcher" can refer to a media production switcher (e.g., media production switcher 151) and "output" 304 can refer to a distribution server (e.g., distribution node 127).

According to the exemplary aspect, an operator of the media production optimizer 101 can use controller 210 to dynamically change the layout of the user interface 205. For example, the operator may wish to dynamically add a mix effects engine to the layout to present a video editing function applied to the "analysis" 301. FIG. 3B illustrates a second instance of a user interface 302B in which the operator has added a M/E engine widget 306 another analysis widget 305. For example, the operator can do so by dragging and dropping additional widgets from a widget catalog, and then further dragging and dropping additional connection lines, as well as rerouting the direct connection between analysis 301 to switcher 303 (as shown in FIG. 3A) to instead be from analysis 301 to M/E engine 306.

As noted above, the media production optimizer 101 is configured to dynamically compile the underlying code so that the system operator can see the debug of the factory in "real time". As will be described in greater detail below, making these dynamic changes and additions to the video production layout will provide the operator instantaneous (e.g., real-time or nearly real-time) feedback as to how such modifications will affect the performance of the system. Yet further, the system can be configured to monitor various characteristics of system (e.g., bandwidth, latency, quality, etc.) and provide dynamic modification proposals to the system to optimize the layout configuration. These features will also be discussed in greater detail below.

Thus, as shown in FIGS. 3A and 3B, which illustrate first and second instances of a user interface for a media production layout, it should be appreciated that an operator can dynamically model the configuration and effectively build the media production factory. In various aspects, the size of the layouts can be modified with zoom and pan operators for example, and further be toggled between edit mode and normal operator, with each layout being saved in storage 225, for example. Effectively, the operator can be a library of factories for implementation in live video production environments.

Moreover, each widget of the layout can include an information button that is configured to display information regarding the functionality of the button. In a related aspect, each widget can provide a health indictor (e.g., a color, such as red, yellow or green highlighting) to indicate the status and functionality of the widget. For example, a yellow indictor may indicate a picture freeze, a red indicator may indicate "no signal" and a green indicator may indicate the video feed is fully functional. Based on these indicators, the operator can troubleshoot the specific component on a real-time basis by adjusting the specific component (e.g., swapping out one component for another), as would be understood to one skilled in the art.

According to an exemplary embodiment, the widget manager 220 is further configured to store and/or generate a plurality of different types of widgets, including, for example, an input widget, an output widget, an app widget, a producer widget and a text label widget. The input widgets can be selected from a list of input workloads (e.g., "analysis" 301 and "tape in" 302) and can be inputs of media content (e.g., video and audio data), for example. Moreover, a key-frame can be provided that shows the producer of the input in an example aspect. As noted above, an information button can be provided for the input widgets. Thus, selecting the information button by the user interface would enable to operator to view diagnostic information (e.g., format quality of the content, latency and the like) as a flow manager. Output widgets (e.g., for "output" 304) can include similar functionality as the input widgets. App widgets are configured to enable any application to be selected (other than inputs or outputs). The App widget will display the name of the workload and its functionality, for example, if it is a keyer or mix/effects engine. The producer widget enables any router source to be selected (e.g., as "switcher" 303) and selecting the key-frame can show details of the content flow.

Based on the foregoing, it should be appreciated that an operator of the media production optimizer 101 can be configured to build a layout (or factory) for real-time media content production. Because each widget can correspond to a component of the system (e.g., system 100), the operator is configured to receive real-time feedback of the operation and functionality of the system in an exemplary aspect.

As further shown in FIG. 2, the media production optimizer 101 can include a network and configuration analyzer 215 that is coupled to the network and/or cloud and configured to receive information (e.g., latency, format quality, throughput, CPU usage) from each component and each system connection, which in turn can be reviewed in detail by the respective information buttons as described above. In an exemplary aspect, when each node (e.g., work package) is added as a component to a cloud platform (e.g., as part of a media production environment), current cloud platforms are configured to monitor data, such as CPU usage, memory consumption, bandwidth, latency, and the like. Thus, when these individual work packages are deployed in a cloud platform, the cloud platform in turn can transmit this node analysis information (e.g., latency, format quality, throughput, CPU usage) to the network and configuration analyzer 215. This information in turn can be used to perform aspects the optimization algorithms and techniques described herein. In a variation of this embodiment, media biometrics can be used to interrogate the media signals, such as to determine watermarks or hash pattern codes and to measure time stamps for the media streams. This information can in turn be analyzed to measure latency, format quality, and the like, as would be appreciated to one skilled in the art.

Effectively, the system operator is configured to perform a remote quality control by receive both macro level information for the system as a whole and micro level information for each component by combining and managing the received information. As a result, the system operator can receive graphical feedback of each component, which can include, for example, functional indicators. Importantly, the connections between components also present dynamic information. As noted above, these lines in the user interface correspond to actual network connections between the system components (which may be extending through a cloud computing environment). In doing so, the system operator can view latencies directly for each connection, and, if needed, make dynamic changes or adjustments for optimization purposes. For example, icons next to the lines can graphically illustrate information relating to the latencies for each connection.

For example, in a high latency situation, a system operator can drag and drop an additional component (e.g., router) or different connection line (with higher throughput). In an example aspect, the controller 210 can further receive this dynamic change and, in implementation, reconfigure the actual media production network by transmitting a request to the cloud computing environment to request additional bandwidth for the specific connection line, for example. At the same time, both IAC and CAC can be rendered by the media production optimizer 101.

In an exemplary aspect, the IAC and CAC enables porting (or "lift and shift") that effectively migrates the modified factory to the cloud platform (which includes the media production processing components described above), without redesign. In turn, the cloud computing platform can receive the request and dynamically modify the media production environment in response to the request from the media production optimizer 101 to address the high latency connection and optimize the workflow.

It is noted that alternative exemplary techniques can be used to migrate the system change updates to the cloud platform for the remote media processing system. For example, if the work packages are configured in containers within a cloud platform as described above, the media production optimizer 101 is configured to generate a new container with an update of the application for that work package in response to the system operator's modifications to the factory layout. This new container can then be provide to the cloud platform to dynamically replace an existing container with an updated work package. In another exemplary aspect, the system can simply be configured to dynamically modify an application within an existing software container that is already loaded and running within the cloud platform.

In yet another refinement of the exemplary embodiment, the system operator can further be provided information (from the information button of each respective widget) that indicates the financial cost associated with using that system component corresponding to that widget or connection. For example, the system 100 may currently be using a production switcher (e.g., remote production switcher 151) that is configured to manage a high capacity number of input signals (e.g., one hundred or more input signals), but the actual media production system requires significantly less inputs. In such an instance, the system dashboard (i.e., the user interface) can further be configured to determine that the current switcher implemented in the platform is not required and provide a recommendation for switcher with lower capacity that will also reduce overall costs of the production. In a related aspect, the system operator can be configured to dynamically remove the initial switcher and replace it with the lower capacity switcher to model an updated system, which is again recompiled dynamically in response to the user's modification. Effectively, the system operator can dynamically add and remove nodes (i.e., widgets) from the system and assign workloads accordingly. As a result, the system operator can obtain a current model of the media production system and also define new configurations to optimize production while minimizing costs.

According to an exemplary embodiment, the media production optimizer 101 uses network and configuration analyzer 215 that is configured to receive information regarding the actual media production environment and monitoring the functionality of each node and each edge (i.e., each connection) within the infrastructure. The topological view (i.e., the modifiable layout) enables a user to make "on-the-fly" adjustments of the factory layout by dragging and dropping the various widgets and connections to optimize the way signals are routed and processed in the system. Moreover, the media production optimizer 101 is also configured to generate optimized views that presents recommendations for changes, such as rerouting of connections and/or adding and replacing of certain system components. That is, based on latencies restraints and issues, the system can be configured to display a recommended change in connection lines to improve performance. In one exemplary aspect, the media production optimizer 101 can be configured to generate a superimposed view that would be presented on top of the current layout (e.g., in a semi-transparent view) that enables the user to view a delta between the existing topology and an optimal topology based on minimal latency, minimal cost or some variant of the different factors, for example. In other words, the media production optimizer 101 could dynamically generate an optimal factory layout model that illustrates a shortened critical path of the media production of the captured essence.

Moreover, the media production factory layout (as presented in the user interface) can be customizable to present important information to the system operator. For example, as noted above, the widgets can include indicators (e.g., colors or flashing notices) that present a status of the corresponding components. Yet further, the connections between the nodes can be customized. For example, the thickness of the line may be automatically adjusted based the available throughput of each node. In addition, dashed lines may represent compressed signals and solid lines may represent uncompressed signals. Placing the cursor over each connection can further be configured to pop up information about the connection (including protocol, bandwidth, latency, and the like). Again, it is reiterated how all of these various pieces of information for the nodes and edges of the layout provide the system operator with a real-time presentation of the details for the media broadcast production. As the operator modifies the position of the nodes and edges of the topology, the media production optimizer 101 dynamically recompiles the code and provides an updated view of the media production configuration.

Figure 4A:
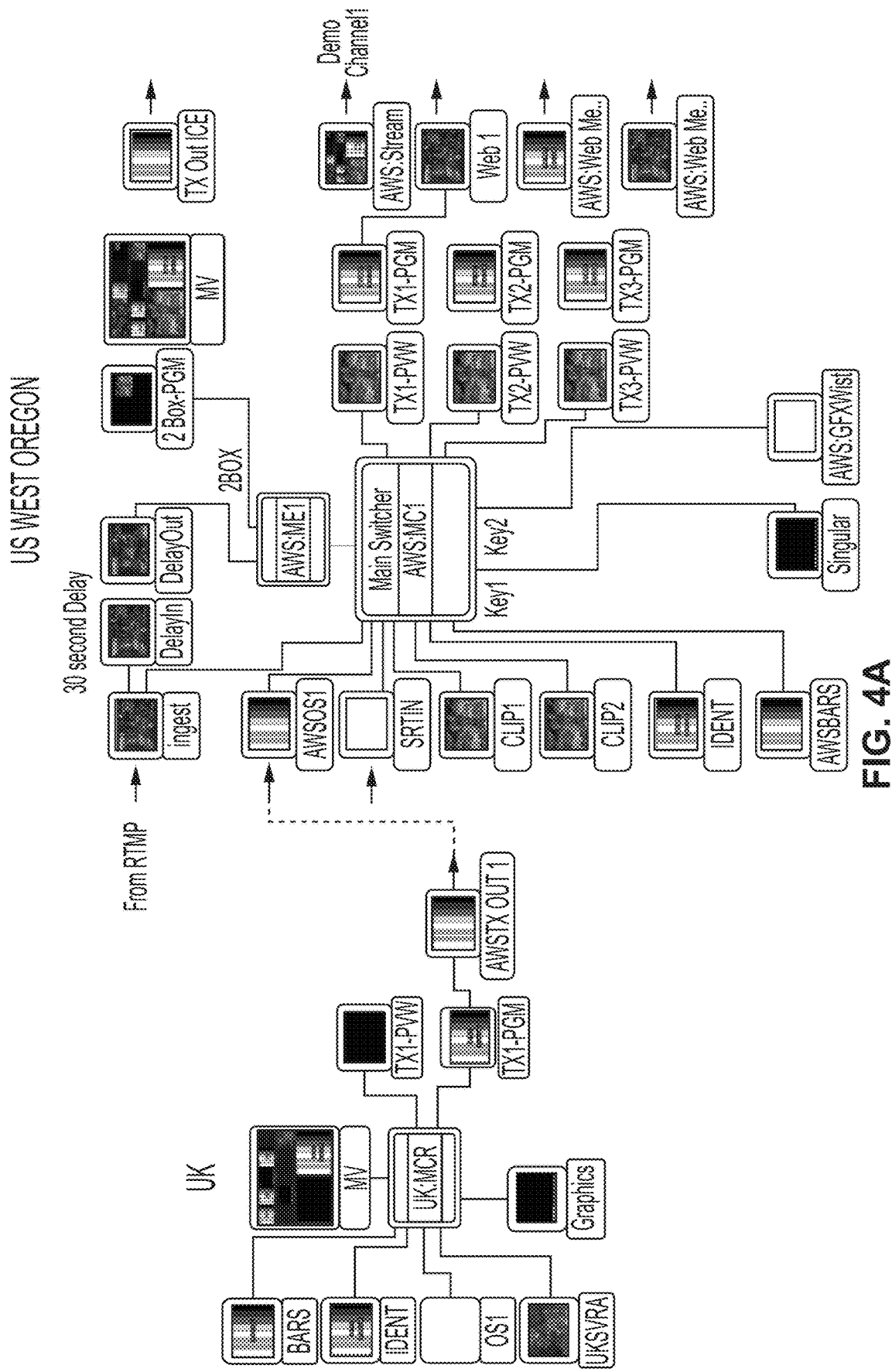
FIGS. 4A through 4C illustrate exemplary screenshots of a layout for a media production system according to the exemplary embodiment.
Figure 4B:
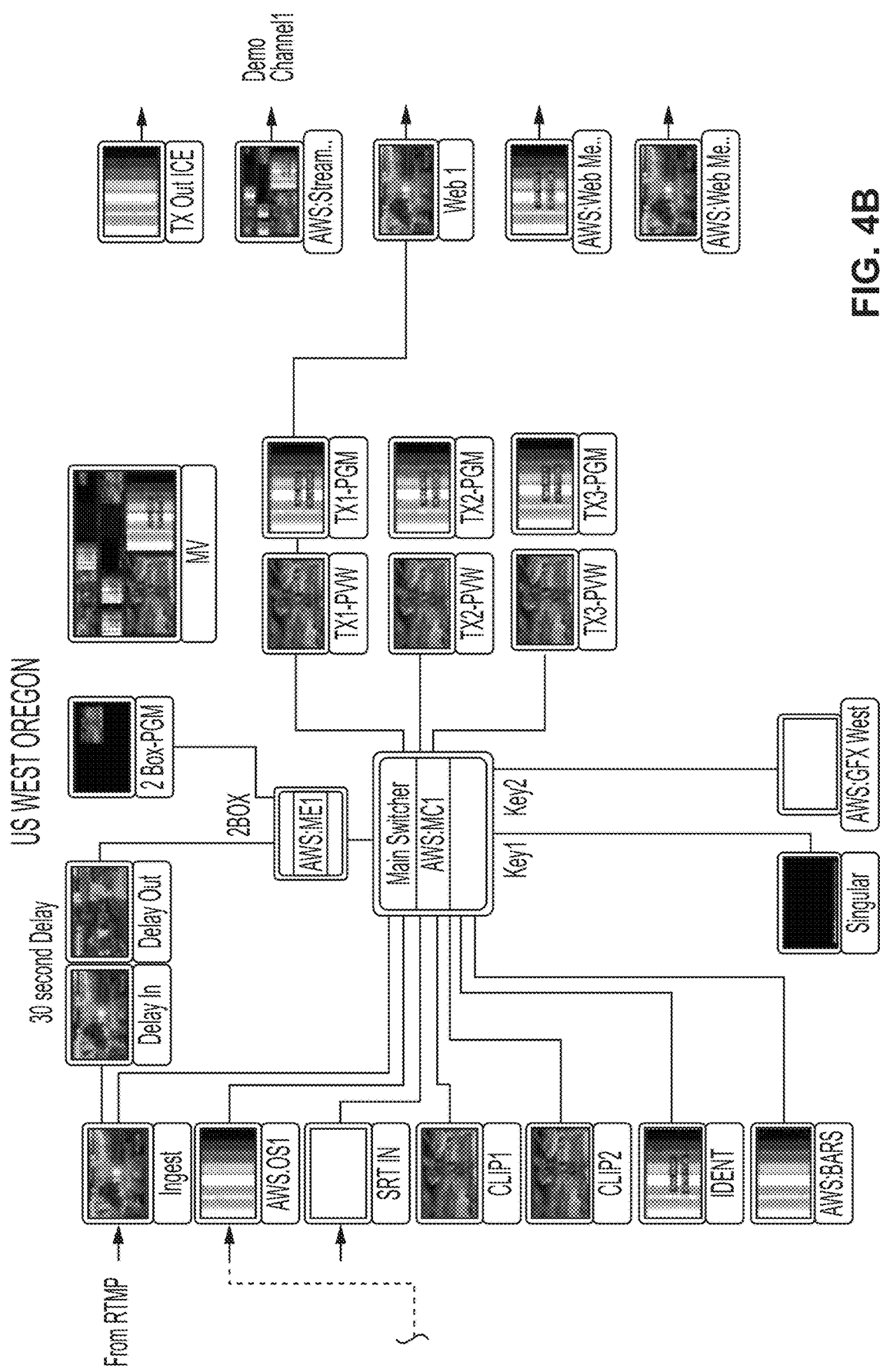
Figure 4C:

FIGS. 4A through 4C illustrate exemplary screenshots of a layout for a media production system according to the exemplary embodiment. It is noted that FIG. 4A illustrates combined single layout as part of the system dashboard so that the system operator can view an overall picture of the system's configuration and performance. In an exemplary aspect, a system operator may be able to zoom in one or more clusters of nodes in the factory layout while seeing others at a 10,000 foot level, for example. Moreover, it is also noted that screen shots shown in FIGS. 4A through 4B can illustrate a video production environment in three stages or planes, an example of which is described in U.S. Pat. No. 10,440,403, issued on Oct. 3, 2019, and entitled "System and Method for Controlling Media Content Capture for Live Video Broadcast Production", the entire contents of which are hereby incorporated by reference.

FIG. 4A illustrates a first plane of media production, in which a plurality of essence data (e.g., video and audio data) is streamed or otherwise transmitted from content generating devices, such as the plurality of content generating devices 102A and 102B. For example, the widgets shown as BARS, IDENT, OS1 and UK: SVRA can correspond to various media streams and MV can correspond to a multi-viewer that shows the content with a graphics applied thereto. One or more of these signals can be fed out from this initial plane (e.g., "UK") as a TX OUT 1—output signal. As further shown, this information is transmitted to a main switcher ("AWS:MC 1") in a separate geographic region ("US WEST OREGON") in the second plane where various editing functions (e.g., mixing and keying) can be performed. Finally, a third plane include a plurality of playout media streams (e.g., "Demo Channel 1"). As noted above, FIG. 4A is merely an example as a factory layout for media production, and as described above, a system operator can user the controller 210 to dynamically adjust the user interface 205 by dragging and dropping widgets and connection lines. By doing so, the user controls and instructions will in turn change the configuration of the media production infrastructure and workflow as designed by the user by using the methods and algorithms as described above.

Moreover, FIG. 4B illustrates a second plane of media production, which includes video editing, by adding mix effects, transitions, and the like. As noted above, a system can be configured to zoom in to view one or more cluster of nodes of a large factory layout. As shown in FIG. 4B, the screen includes a widget for a switcher (e.g., remote production switcher 151) that includes a plurality of inputs and outputs, including, for example, a multi-viewer ("MV") that is configured to provide images of the inputs and previews of the outputs (with effects applied thereto) for example.

FIG. 4C illustrates a screen shot when a system operator selects the information button of a specific component (or node or work package) in the factory layout. In this example, the system operator has selected "CLIP 2" (e.g., a video clip from a video server) and can view the status or health (e.g., "aws-clip2—OK" and "aws-clip2-Plauyer—OK"). Additional metadata about the clip is further shown. As a result, the system operator can select information buttons for the various nodes and edges to obtain real-time diagnostic information for the media production.

Figure 5:
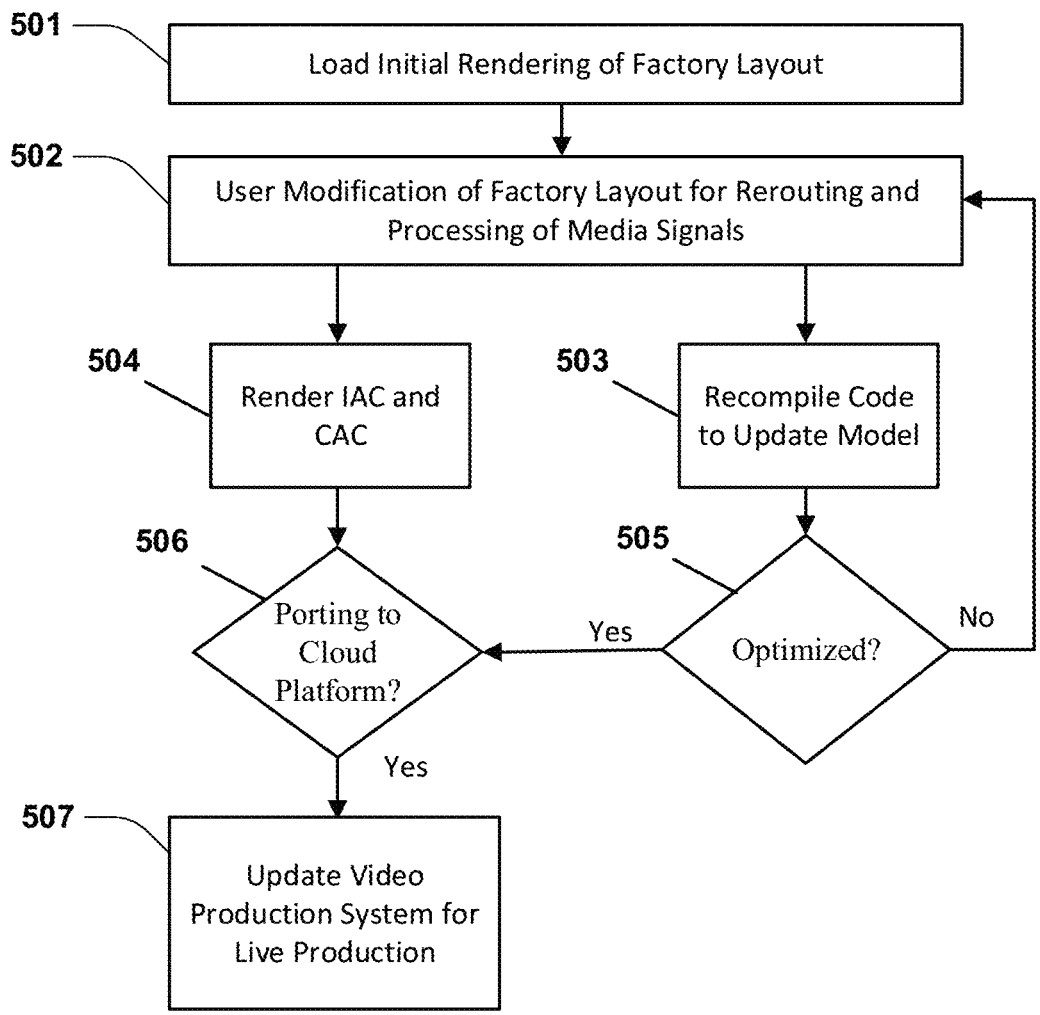
FIG. 5 illustrates a flowchart for a method for dynamically optimizing media content generation and productions in a real-time environment according to an exemplary embodiment.

FIG. 5 illustrates a flowchart for a method for dynamically optimizing media content generation and productions in a real-time environment according to an exemplary embodiment. In general, it should be appreciated that the method 500 can be performed using one or more of the exemplary systems and components described above.

As shown, initially at step 501, the controller 210 is configured to load a user interface 205 with an initial layout for a factory model. In one example, this initial layout may be a blank template that is designed by the system operator. In another example, the initial layout may be preloaded a standard or saved layout (e.g., if a user previously designed the layout and is now upgrading or changing components). The initial layout is displayed on a display screen of a computer device executing the media production optimizer 101, as described above. Yet further, the media production optimizer 101 may be configured to receive "live" information from each component in an actual media production system and then to build an initial representation of the factory layout based on this information.

At step 502, the user is configured to dynamically modify the factory layout by dragging and dropping widgets to add or remove these components and also to drag and move connections. As described above, doing so provides a real-time model and functional feedback of the factory layout. To do so, the media production optimizer 101 compiles/recompiles the underlying code to model the factory layout at step 503.

Concurrently, the media production optimizer 101 is also configured to render IAC and CAC at step 504. As described above, the IAC and CAC enables porting (or "lift and shift") that effectively migrates the modified factory to the cloud platform. Step 504 can be performed in parallel with or in sequence to step 503, for example. It is also noted that IAC and CAC are examples of how the modified factory can be loaded as a real-life implementation of the media production infrastructure in the cloud platform, but alternative techniques can be used.

At step 505, the updated model for the factory layout is optimized. This can be performed automatically by the media production optimizer 101 using the techniques described above and can be done for optimizing from a cost perspective or alternatively a performance perspective. The system operator can then determine at step 505 if these optimization is complete based on the current factory layout. If not, the method returns to step 502 where the system operator can continue to dynamically modify the factory layout.

Otherwise, if the factory layout is deemed optimal at step 505, the method proceeds to step 506 where the IAC and CAC enables the porting of the configurations and reconfigurations to the cloud platform. By doing so, the video production system for live production can then be updated by the cloud platform at step 507. As a result, a factory layout for media production can be dynamically modelled and/or optimized and, further can be deployed in a cloud platform environment according to an exemplary aspect.

Figure 6:
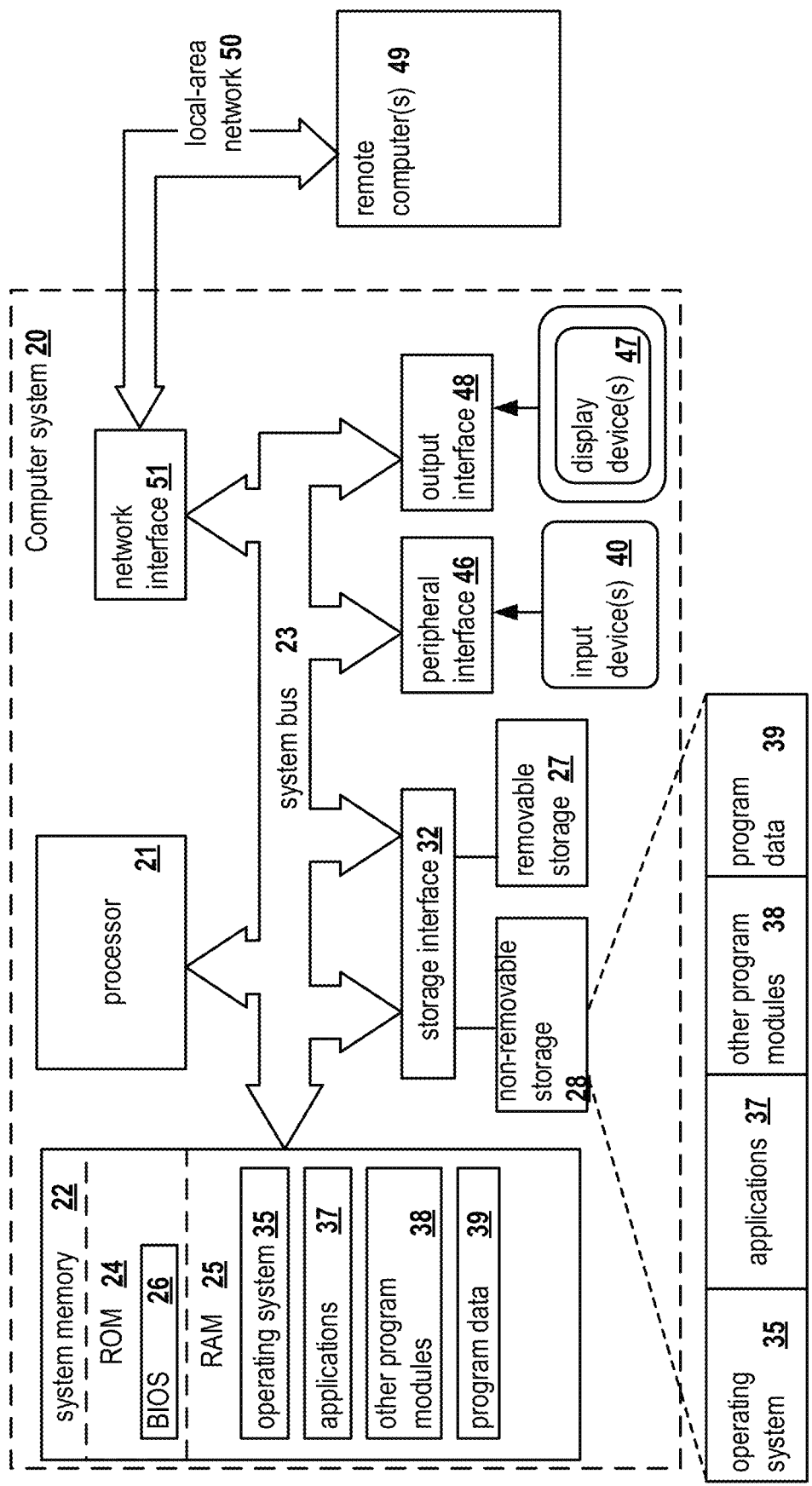
FIG. 6 is a block diagram illustrating a computer system on which aspects of systems and methods for dynamically optimizing media content generation and productions in a real-time environment according to an exemplary embodiment.

FIG. 6 is a block diagram illustrating a computer system on which aspects of systems and methods for dynamically optimizing media content generation and productions in a real-time environment according to an exemplary embodiment. It should be noted that the computer system 20 can correspond to any computing system configured to execute the media production optimizer 101 or any components therein. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20. It should be appreciated that in one exemplary aspect, the one or more removable storage devices 27 can correspond to storage 225, for example.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter, and can be configured to generate user interface 205, for example. In addition to the display devices 47, the computer system 20 may be equipped with other peripheral output devices (not shown), such as loudspeakers and other audio-visual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Moreover, the remote computer (or computers) 49 can correspond to any one of the remote processing nodes or client devices as described above with respect to FIG. 1 as well as generally to a cloud computing platform for configuring the media production system.

Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet (e.g., Internet 103). Examples of the network interface 51 may include an Ethernet interface, a Frame Relay interface, SONET interface, and wireless interfaces.

In general, it is noted that the exemplary aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIGS. 1 and 2, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A system for generating a factory layout to dynamically optimize a media content production in a real-time environment, the system comprising:
   a memory;
   a processor configured to implement instructions on the memory so as to provide a media production optimizer that includes a widget controller configured to provide a plurality of widgets that represent work packages as a plurality of a micro-services that each perform an atomic function of the media content production, respectively;
   a database configured to store the plurality of widgets;
   a user interface controller configured to receive inputs from an operator of a user interface of the system to dynamically update the factory layout for the media content production, wherein the received inputs include respective position of the plurality of widgets and moving connection lines between at least a portion of the plurality of widgets displayed on the user interface to represent a data flow of media essence for the media content production;
   a network and configuration analyzer configured to receive real-time performance characteristics relating to operations of the plurality of micro-services;
   wherein the user interface provides information buttons for each of the plurality of widgets included in the factory layout that identify the real-time performance characteristics of the plurality of micro-services, respectively;
   wherein the media production optimizer is configured to recompile underlying code to update a model of the factory layout that is displayed on the user interface in response to the inputs from the operator of the system to present a debug state of the factory layout in real time that includes a display of real-time feedback of how a dynamic changes to the factory layout affect at least one of bandwidth constraints, latency, and quality to the media content production;
   wherein the media production optimizer is configured to render infrastructure as code ("IAC") and configuration as code ("CAC");
   wherein the processor, when implementing instructions on the memory, further configures the media production optimizer to migrate, using the IAC and CAC, the updated factory layout to a cloud platform that includes a plurality of media production components including the plurality of micro-services for deployment thereon for performing the media content production.

2. The system according to claim 1, wherein the user interface is configured to display each widget of the plurality of widgets to an information button that displays a health indictor corresponding to at least one of a status and a functionality of the respective widget.

3. The system according to claim 1, wherein, as the user interface controller receives inputs from the operator via the user interface to dynamically update the factory layout for the media content production, the media production optimizer logically organizes and compiles underlying code to model the factory layout.

4. The system according to claim 1, wherein each widget of the plurality of widgets comprises one of an analysis widget, tape-in widget, a switcher widget and an output widget.

5. The system according to claim 1, wherein the user interface controller is configured to dynamically change the factory layout in response to receiving the inputs from the operator that include dragging and dropping additional widgets of the plurality of widgets from a widget catalog, and then at least one of dragging and dropping additional connection lines and rerouting existing connection lines between an existing widget in the factory layout and at least one of the additional widgets.

6. A system for generating a factory layout to dynamically optimize a media content production in a real-time environment, the system comprising:
   a memory;
   a processor configured to implement instructions on the memory so as to provide a media production optimizer that includes a widget controller configured to provide a plurality of widgets that represent work packages as a plurality of a micro-services that each perform an atomic function of the media content production, respectively;
   a database configured to store the plurality of widgets;
   a user interface controller configured to receive inputs from an operator of a user interface of the system to dynamically update the factory layout for the media content production, wherein the received inputs include respective position of the plurality of widgets and moving connection lines between at least a portion of the plurality of widgets displayed on the user interface to represent a data flow of media essence for the media content production;
   a network and configuration analyzer configured to receive real-time performance characteristics relating to operations of the plurality of micro-services;
   wherein the user interface provides information buttons for each of the plurality of widgets included in the factory layout that identify the real-time performance characteristics of the plurality of micro-services, respectively;
   wherein the processor, when implementing instructions on the memory, further configures the media production optimizer to:
      recompile underlying code to update a model of the factory layout that is displayed on the user interface in response to the inputs from the operator of the system to present a debug state of the factory layout in real time that includes a display of real-time feedback of how dynamic changes to the factory layout affect at least one of bandwidth constraints, latency, and quality to the media content production; and
      migrate the updated factory layout to a cloud platform that includes a plurality of media production components including the plurality of micro-services for deployment thereon for performing the media content production.

7. The system according to claim 6, wherein the processor, when implementing instructions on the memory, further configures the media production optimizer to render infrastructure as code ("IAC") and configuration as code ("CAC") and migrate the updated factory layout to the cloud platform using the IAC and CAC.

8. The system according to claim 6, wherein the user interface is configured to display each widget of the plurality of widgets to an information button that displays a health indictor corresponding to at least one of a status and a functionality of the respective widget.

9. The system according to claim 6, wherein, as the user interface controller receives inputs from the operator via the user interface to dynamically update the factory layout for the media content production, the media production optimizer logically organizes and compiles underlying code to model the factory layout.

10. The system according to claim 6, wherein each widget of the plurality of widgets comprises one of an analysis widget, tape-in widget, a switcher widget and an output widget.

11. The system according to claim 6, wherein the user interface controller is configured to dynamically change the factory layout in response to receiving the inputs from the operator that include dragging and dropping additional widgets of the plurality of widgets from a widget catalog, and then at least one of dragging and dropping additional connection lines and rerouting existing connection lines between an existing widget in the factory layout and at least one of the additional widgets.

12. A system for generating a factory layout to dynamically optimize a media content production in a real-time environment, the system comprising:
   a memory;
   a processor configured to implement instructions on the memory so as to provide a media production optimizer that includes a widget controller configured to provide a plurality of widgets that represent work packages as a plurality of a micro-services that each perform a function of the media content production, respectively; and
   a user interface controller configured to receive inputs from an operator of a user interface to dynamically update the factory layout for the media content production, wherein the received inputs include respective position of the plurality of widgets and establishing connection lines between at least a portion of the plurality of widgets displayed on the user interface to represent a data flow of media essence for the media content production,
   wherein the processor, when implementing instructions on the memory, further configures the media production optimizer to:
      recompile underlying code to update a model of the factory layout that is displayed on the user interface in response to the inputs from the operator of the system to present a debug state of the factory layout in real time that includes a display of real-time feedback of how dynamic changes to the factory layout affect at least one of bandwidth constraints, latency, and quality to the media content production, and
      migrate the updated factory layout to a cloud platform that includes a plurality of media production components including the plurality of micro-services for deployment thereon.

13. The system according to claim 12, further comprising:
   a network and configuration analyzer configured to receive real-time performance characteristics relating to operations of the plurality of micro-services,
   wherein the user interface is configured to display information buttons for each of the plurality of widgets included in the factory layout that identify the real-time performance characteristics of the plurality of micro-services, respectively.

14. The system according to claim 12, wherein the processor, when implementing instructions on the memory, further configures the media production optimizer to render infrastructure as code ("IAC") and configuration as code ("CAC") and migrate the updated factory layout to the cloud platform using the IAC and CAC.

15. The system according to claim 12, wherein the user interface is configured to display each widget of the plurality of widgets to an information button that displays a health indictor corresponding to at least one of a status and a functionality of the respective widget.

16. The system according to claim 12, wherein, as the user interface controller receives inputs from the operator via the user interface to dynamically update the factory layout for the media content production, the media production optimizer logically organizes and compiles underlying code to model the factory layout.

17. The system according to claim 12, wherein each widget of the plurality of widgets comprises one of an analysis widget, tape-in widget, a switcher widget and an output widget.

18. The system according to claim 12, wherein the user interface controller is configured to dynamically change the factory layout in response to receiving the inputs from the operator that include dragging and dropping additional widgets of the plurality of widgets from a widget catalog, and then at least one of dragging and dropping additional connection lines and rerouting existing connection lines between an existing widget in the factory layout and at least one of the additional widgets.

\* \* \* \* \*